United States Patent Office 2,893,455
Patented July 7, 1959

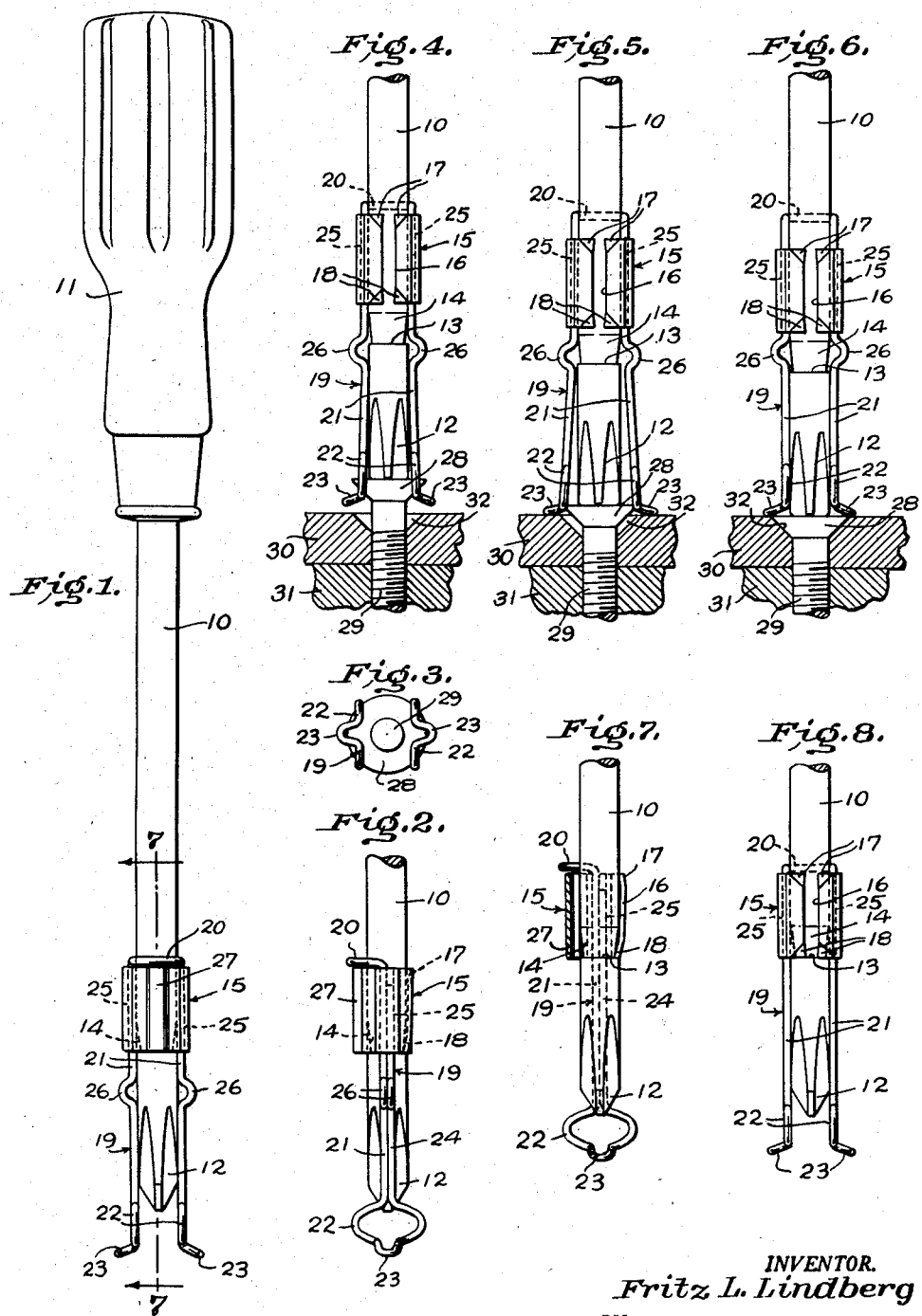

2,893,455
SCREW HOLDER FOR SCREW DRIVERS

Fritz L. Lindberg, Flint, Mich.

Application December 5, 1956, Serial No. 626,345

5 Claims. (Cl. 145—52)

The present invention relates to an improved screw holder for screw drivers, and essentially consists of a further development of the invention shown in my copending application entitled Screw Holder for Screw Drivers, Serial No. 499,665, filed April 6, 1955 now Patent No. 2,789,601.

Generally, the present invention consists of a screw driver having a conventional handle and shank and provided at the free end of the shank with the usual blade. Adjacent the blade and in spaced relation thereto, the shank is provided with a shoulder. There is slidably and rotatably mounted upon the shank a split sleeve having its corner portions bent inwardly. A spring wire member of substantially U-shape formation extends slidably through the split sleeve and consists of a laterally extending bight portion forming a finger piece and a pair of substantially parallel legs, each having its free end formed with a looped screw head-engaging member. The device is such that it may be quickly placed in condition for receiving the head of a screw, adjusted to another position for engagement by the blade of the screw driver with the head of the screw, and thereafter automatically disengaged from the head of the screw due to the peculiar formation of the screw head-engaging members.

It is accordingly an object of the invention to provide a novel and improved screw holder for screw drivers.

Another object of the invention is to provide, in a device of the character set forth, novel means for yieldably limiting the outward sliding movement of a split sleeve forming a part of the invention.

A further object of the invention is to provide, in a device of the character set forth, novel means for maintaining a sleeve forming a part of the invention in preselected positions.

Still another object of the invention is to provide, in a device of the character set forth, novel means for quick and positive positioning of parts of the holder relative to a screw driver for convenient reception of the head of a screw in the holder and for quick and positive relocating of parts of the holder relative to the screw driver to engage and yieldingly hold the blade of the screw driver in the slotted head of the screw.

A further and important object of the invention is to provide, in a device of the character set forth, novel means for gripping the head portion of a screw and further novel means for releasing such head portion as the screw is threaded into another object.

Other and further objects of the invention will become apparent from a reading of the following specification taken in conjunction with the drawing, in which:

Figure 1 is an enlarged front elevational view of an embodiment of the invention showing the same mounted upon a screw driver, and a position on the screw driver for receiving the head of a screw;

Figure 2 is a fragmentary side elevational view of Figure 1;

Figure 3 is a bottom plan view of the device shown in Figures 1 and 2;

Figure 4 is a fragmentary rear elevational view of Figure 1 illustrating the parts of the device in positions when engaged with a screw head;

Figure 5 is a view similar to Figure 4 but illustrating the device as it appears immediately before automatic disengagement of the holder from the screw head of the screw;

Figure 6 is a view similar to Figures 4 and 5 but illustrating the position of parts immediately after the holder has automatically disengaged from the screw head;

Figure 7 is a sectional view taken substantially along line 7—7 of Figure 1; and Figure 8 is a rear elevational view of a slightly modified form of the invention, the parts being illustrated in the same position as that shown in Figures 1 and 2.

Referring more particularly to the drawing, there is shown a screw driver having a shank 10 that is round in cross section and provided with a conventional handle 11 at one of its ends. The other end of the shank 10 is shown as having formed thereon conventional "Phillips type" blade 12, however, it is to be understood that any other type of blade may be employed.

Inwardly of and adjacent the blade 12, the shank 10 is provided with an angular groove having a radially extending wall or shoulder 13 next to said blade and an outwardly tapering wall 14 extending from the depth of said groove at said shoulder to the outer diameter of the shank 10 and in the direction of the handle.

Mounted upon the shank 10 for both slidable and rotatable movement is a sleeve, generally indicated at 15, preferably formed of thin spring metal and having a slit 16 longitudinally therethrough, thus forming a pair of corner portions 17 at one end of the sleeve and another pair of corner portions 18 at the other end of said sleeve, all of such corner portions 17 and 18 being bent inwardly toward the shank 10 so as to apply pressure on the shank at spaced intervals and thereby frictionally resist movement of said sleeve relative to the shank.

A spring wire member, generally indicated at 19, is bent to substantially U-shape and is provided with a laterally extending bight portion 20 straddling the shank 10 and forming a finger piece at one end of a pair of dependent legs 21, each of which has formed at its other end a screw head-engaging loop 22. Each of the loops 22 is formed with an outwardly and angularly bowed lip 23 of substantially V-shape that diverge from one another as they extend beyond the portions of said loops in contact with the screw head. The inner surfaces of the loops 22 are of a size less than the diameter of the head of a screw to be held thereby so that said loops partially receive and engage opposite sides of the screw head. Also, the loops 22 are of substantially elliptical configurations and with their lengths at right angles to the legs 21 so that opposite slower curved portions thereof extending between points of engagement with the screw head are spaced beyond and partially under and over the screw head. It is at the intermediate portions of the most forward slower curved portions of the loops 22 that the outwardly angled bowed lips 23 are formed. The free ends of the wire structure 19 are bent in return bends, as shown at 24, in Figure 2, to reinforce the legs 21.

The sleeve 15 is provided with directly opposite longitudinal channels 25 to slidably accomodate the legs 21 and their return bends 24, and the legs 21 and return bends 24 are each provided with an outwardly bowed portion 26 which lie in spaced relation to the sleeve 15 when the latter is in abutting relation to the laterally extending finger piece 20. Directly opposite the slit 16 and substantially ninety degrees from the channels 25 is an outward longitudinally formed humped portion 27 extending the entire length of the sleeve and forming a finger-engaging shoulder for manually sliding the sleeve on the screw driver shank. It is to the side of the sleeve having the humped portion 27 thereon that the bight portion 20 of the wire member 19 is laterally bent.

Figure 8 of the drawings shows a slightly modified form of the invention wherein the outwardly bowed portions 26 on the legs 21 and their return bends 24 have been eliminated. In this case, the wire member 19 is not limited to just sufficient sliding movement relative to the sleeve for disengaging the loops 23 from the head 28 of the screw 29.

In operation, when it is desired to connect, for example, a pair of plates 30 and 31 together by means of a screw 29, the first step taken with the present device would be to move the finger piece 20 downwardly with the thumb or forefinger of a hand holding the screw driver until the inturned corner portions 18 engage with the shoulder 13 (Figures 1 and 2). This places the screw head-engaging loops 22 in proper position with relation to the blade 12 so that the head 28 of the screw may be inserted between the loops 22 to be engaged thereby, the lips 23 assisting in guiding the head 28 to such position (Figure 3). Without releasing the grip of the hand on the screw driver, the thumb or forefinger of said hand is moved slightly down the shank of the screw driver to engage the outer end of the humped portion 27 on the sleeve. By then sliding the sleeve inwardly to disengage the inturned corner portion 18 from the shoulder 13, the wire member 19 will be moved therewith, due to engagement of the laterally turned bight portion 20 with the opposite end of said sleeve. This sliding movement of parts will bring the head 28 of the screw between the loops 22 into engagement with the blade 12 of the screw driver for inserting the edge of the blade in the slotted opening of the screw (Figure 4). The screw 29 will now remain in position without further handling, and the screw driver may be manipulated utilizing only the handle 11 to insert the screw 29 in the openings provided in the plates 30 and 31.

When downward pressure and turning movement are applied to the handle 11 in the usual manner, the screw is threaded into the plates until the head 28 thereof starts to enter the usual countersunk opening 32 provided for the head 28. When this occurs, the lips 23 will engage the face of the plate 30 outwardly of the countersunk openings 32 and the same, together with the legs 21, will be cammed outwardly by the screw head 28 and with respect to the blade 12 (Figure 5). Further turning of the screw 29 to its final position will disengage the head-engaging loops 22 from the screw head and will allow the lips 23 and consequently the loops 22 to again move to a position adjacent the blade 12 (Figure 6), whereupon the entire screw driver and its attachment may be removed without further ado.

By again referring to Figures 4, 5, and 6, it will be observed that the sleeve 15 did not slide on the shank 10 of the screw driver during disengagement of the head-engaging loops 22 from the head 28 of the screw, but instead, the wire member 19 was moved upwardly on said shank and relative to said sleeve and said shank. The reason for this is because there is greater frictional engagement of the sleeve with the shank than the resistance offered to sliding movement of the wire member in the sleeve.

It should be understood that without the provision of the lips 23 and when threading a screw in a countersunk opening, the lower portions of the loops 22 would tend to remain beneath the head 28 due to the inclination of the countersunk surface engaged by the loops whereupon further turning of the screw would compress and lock the loops 22 between the head 28 and the countersunk opening 32. It will thus be seen that there is an automatic disengagement of the screw head by the present device which takes place by the mere tightening of the screw 29.

When it is desired to remove the screw 29, it is only necessary to engage the blade 12 with the head 28 in conventional manner and to then turn the screw 29 in such manner that it moves outwardly from the plate 30 or other device with which it is engaged. When the screw has thus been turned a sufficient distance, it is only necessary to press downwardly upon the finger piece 20 to thereby engage the loops 22 with the head 28 in the manner shown, for example, in Figure 4, the lips 23 assisting in such operation by guiding and spreading the arms 21 to allow the head 28 to enter between the loops 22. Further turning of the handle 11 allows the screw 29 to become entirely disengaged from the plates 30 and 31 or the like and yet remain physically connected to the screw driver from which it may be removed at will by a mere outward pull upon the same.

While but two forms of the invention have been shown and described herein, it will be readily apparent to those skilled in the art that many minor modifications may be made without departing from the spirit of the invention or the scope of the appended claims.

What is claimed is:

1. A device of the character described comprising, in combination, a screw driver having a handle, a shank, and a blade, said shank having an annular groove forming a shoulder in spaced relation to said blade, a split sleeve frictionally slidable on said shank and on that side thereof remote from said blade, means in said sleeve for engaging said shoulder whereby to limit the movement of said sleeve toward said blade, a pair of substantially parallel spaced spring legs carried by said sleeve and slidable for limited longitudinal movement relative to said sleeve and shank, said legs being arranged in close proximity to opposite sides of said shank and having end portions thereof projecting forwardly of said sleeve and along side of said blade, screw head-engaging loops integrally formed at the forward ends of said legs and extending in planes parallel to the axis of said shank, and an angularly and outwardly extending lip integrally formed at the outer end of each loop.

2. A device of the character described comprising, in combination, a screw driver having a handle, a shank, and a blade, said shank having an annular groove forming shoulder in spaced relation to said blade, a split sleeve frictionally slidable on said shank and on that side thereof remote from said blade, a pair of inturned inwardly biased corner portions in said sleeve for engaging said shoulder whereby to limit the movement of said sleeve toward said blade, a U-shaped spring wire member having legs slidable through said sleeve for limited movement, said legs being arranged in close proximity to opposite sides of said shank and having end portions thereof projecting forwardly of said sleeve and along side of said blade, and screw head-engaging loops integrally formed at the forward ends of said legs.

3. A device of the character described comprising, in combination, a screw driver having a handle, a shank, and a blade, said shank having an annular grove forming a shoulder in spaced relation to said blade, an elongated sleeve split longitudinally thereof and both slidable and rotatable on said shank and on that side of the groove remote from said blade, a U-shaped spring wire member having legs slidable for limited movement through said sleeve, screw head-engaging loops integrally formed at the forward ends of said legs and at opposite sides of said blade, and inturned portions at corners of said split and ends of said sleeve so as to frictionally resist movement of the sleeve on the shank and for engaging said shoulder to limit the sliding movement of said sleeve toward said blade.

4. A device as defined in claim 3 wherein said groove is provided with a radially extending face adjacent said blade and forming said shoulder, and an inwardly and angularly extending face remote from said blade.

5. A device of the character described comprising, in combination, a screw driver having a handle, a shank, and a blade, said shank having an annular groove forming a shoulder in spaced relation to said blade, a split sleeve frictionally slidable on said shank and on that side thereof remote from said blade, means in said sleeve for engaging said shoulder whereby to limit the movement of said sleeve toward said blade, a U-shaped spring wire member having legs parallel with and slidable for limited movement through said sleeve, screw head-engaging loops integrally formed on said legs, and means for automatically disengaging said loops from a screw head during the driving of a screw by said blade.

References Cited in the file of this patent

UNITED STATES PATENTS

| | | |
|---|---|---|
| 1,562,543 | Cox | Nov. 24, 1925 |
| 1,782,565 | Dohnal | Nov. 25, 1930 |
| 2,292,657 | Priest | Aug. 11, 1942 |
| 2,317,085 | Raby | Apr. 20, 1943 |
| 2,633,168 | Mahaffey | Mar. 31, 1953 |
| 2,789,601 | Lindberg | Apr. 23, 1957 |

FOREIGN PATENTS

| | | |
|---|---|---|
| 589,025 | Great Britain | June 10, 1947 |